US005545028A

United States Patent [19]
Hume et al.

[11] Patent Number: 5,545,028
[45] Date of Patent: Aug. 13, 1996

[54] BUSHING TIP FOR INJECTION MOLDING APPARATUS

[75] Inventors: William J. Hume, Amesbury; Paul M. Swenson, Hamilton; Michael L. Vasapoli, Magnolia, all of Mass.

[73] Assignee: Kona Corporation, Gloucester, Mass.

[21] Appl. No.: 291,297

[22] Filed: Aug. 16, 1994

[51] Int. Cl.⁶ .................................................. B29C 45/20
[52] U.S. Cl. ........................................ 425/549; 264/328.15
[58] Field of Search ...................... 425/549; 264/328.15

[56] References Cited

U.S. PATENT DOCUMENTS

| | | | |
|---|---|---|---|
| 4,771,164 | 9/1988 | Gellert | 425/549 |
| 5,268,184 | 12/1993 | Gellert | 425/549 |
| 5,284,436 | 2/1994 | Gellert | 425/549 |
| 5,318,434 | 6/1994 | Gellert | 425/549 |
| 5,346,388 | 9/1994 | Gellert | 425/549 |
| 5,405,258 | 4/1995 | Babin | 425/549 |

*Primary Examiner*—Tim Heitbrink
*Attorney, Agent, or Firm*—Pandiscio & Pandiscio

[57] ABSTRACT

An injection molding apparatus and a bushing for use therein. Pressurized molten material flows intermittently from a source through runner channels in a heated manifold and internal lumens in heated bushings for injection through gates into article formation cavities of a mold. Each bushing includes a conically shaped, distalmost section extending substantially centrally into a mold gate. Each bushing also includes a distally opening annular cavity located between its distalmost section and its inner lumen. The annular cavity has outer walls which are substantially parallel to the bushing axis, and inner walls. The inner walls form a distally tapered shoulder having an outer edge and an inner edge. The outer edge extends substantially helically and distally along an axial projection of the proximal portion of the bushing. The inner edge extends substantially helically and distally along an axial projection of the smaller maximum diameter of the conically shaped portion. A portal connects the closed end of the annular cavity formed by the inner and outer walls to the molten material conveying internal lumen. Melt flow facilitation means such as grooves in the shoulders also are provided. The configuration of the annular cavity creates a substantially uniform, distally directed melt flow at its open end for injection into an article formation cavity along the conically shaped distalmost section.

36 Claims, 11 Drawing Sheets

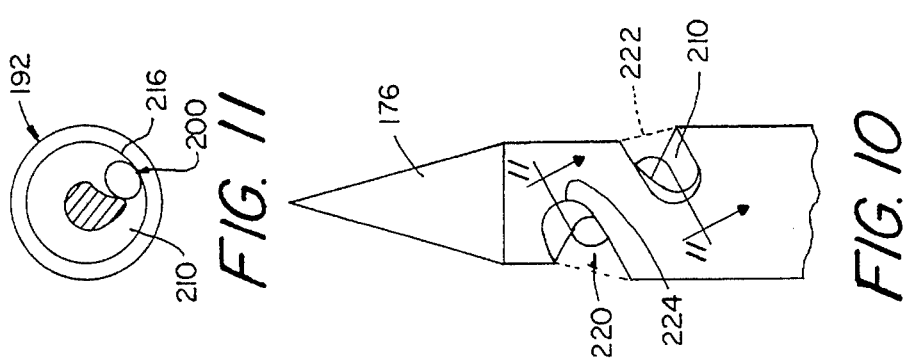
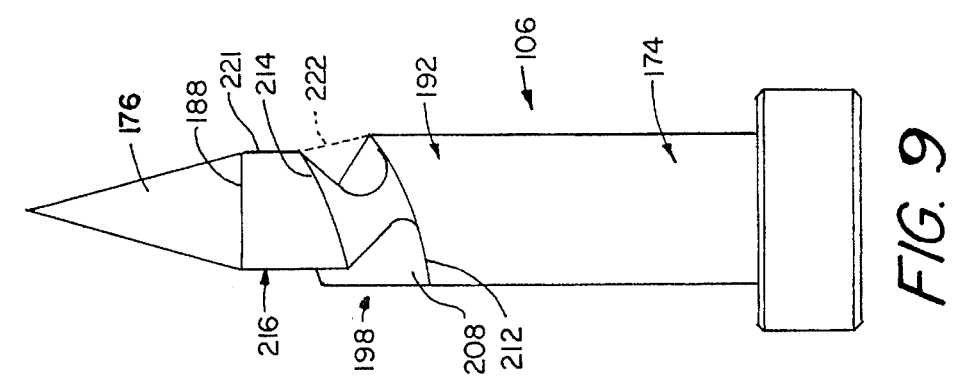

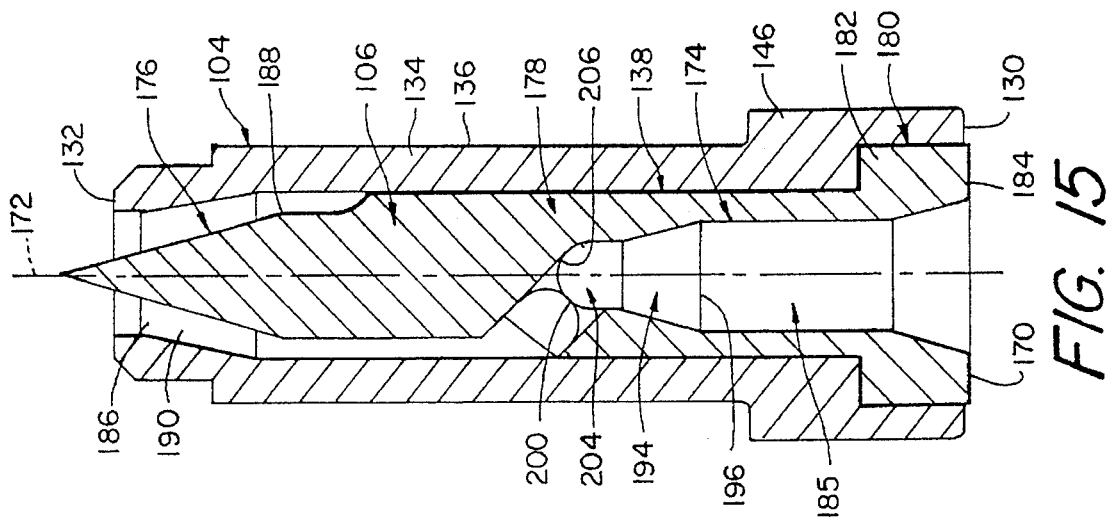
FIG. 15
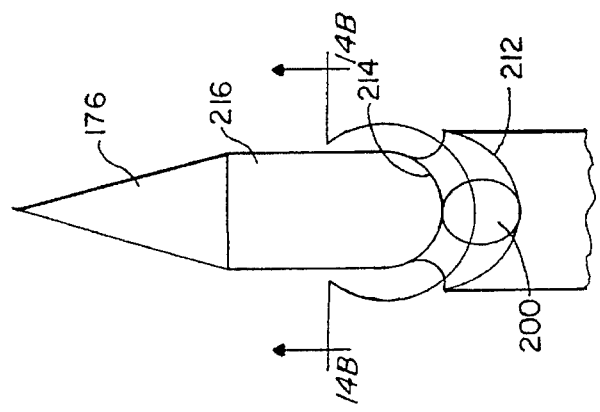
FIG. 14A
FIG. 14B
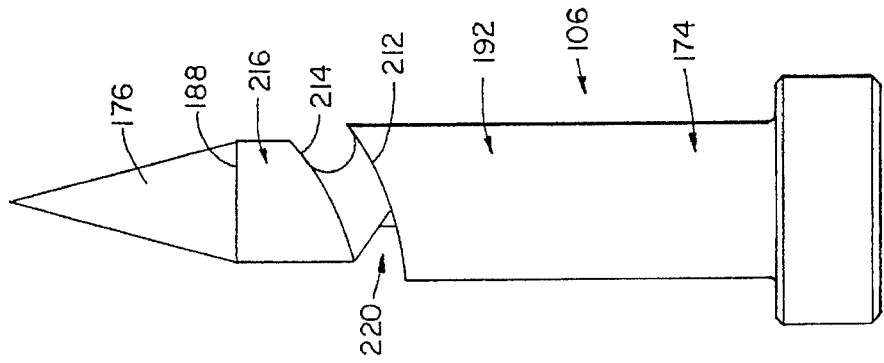
FIG. 13

BUSHING TIP FOR INJECTION MOLDING APPARATUS

BACKGROUND

1. Field of Invention

The present invention relates generally to injection molding apparatus. More particularly, the invention relates to an improved cone tip bushing for use in an injection molding apparatus.

2. Summary of the Prior Art

Various forms of so-called "runnerless", injection molding apparatus are widely used and well known in the art. Such apparatus allows the molder to produce molded articles with only small "vestiges" (i.e., small protrusions of solidified melt material) attached thereto. Accordingly, large sprues or runners attached to completed articles formed by the apparatus are avoided. This provides savings in both trimming labor and material waste. Further, apparatus cycle times are reduced, thereby increasing the efficiency of the injection molding operation. Despite these advantages, however, problems remain.

In "runnerless" injection molding apparatus, molten melt material is intermittently injected into a manifold under pressure for transmission through internal manifold passageways (runners) and bushings. The bushings extend into outer cavities in the surface of the mold to locations substantially adjacent to gates (i.e., passageways having small transverse cross-sections). The gates connect the bases of the outer cavities to inner article formation cavities of the mold. Pressurized "shots" of melt material are ejected from the distal ends of the bushings into the space between the bushings and the adjacent gates (i.e., into the "gate areas"), and thereafter are injected into the inner article formation cavities of the mold through the gates.

The basic concept of such "runnerless" injection molding apparatus is to maintain the melt material in the manifold and the bushings in a molten state throughout the operation of the apparatus, while at the same time allowing melt material injected into the article formation cavities of the mold to solidify and be ejected from the mold as completed articles. To accomplish this, both the manifold and the bushings are maintained at the desired melt temperature, while the mold is cooled. Accordingly, in order for the apparatus to function efficiently, means must be provided which substantially isolate the heated and cooled elements of the apparatus from one another.

The isolation means typically includes support pads located between the bottom manifold surface and the upper mold surface. These support pads provide a spaced, structural contact between the hot manifold and the cold mold. They also are made of material having a low thermal conductivity. Therefore, an air gap is created between the lower surface of the manifold and the upper surface of the mold. That air gap, and those support pads, together act to thermally isolate the hot manifold from the cold mold.

The isolation means also comprises air gaps and/or other insulating means located between the side walls of the outer cavities in the mold and the outer surfaces of the bushings. More particularly, the bushings commonly extend downwardly from the bottom surface of the manifold, through the air gap created by the support pads, and thence into the outer cavities in the mold. The bushings are so sized and mounted as to be spaced from the sidewalls and the bases of the respective outer mold cavities.

In addition, features such as (i) slots in the manifold radiating from the proximal ends of the bushings mounted in the manifold, and (ii) centering protrusions extending axially upwardly from the bases of the outer mold cavities which are adapted to engage the respective bushings proximally of the adjacent gate areas, are often incorporated into the apparatus design. The slots allow the bushings to remain centered relative to their respective associated outer mold cavities despite thermal expansion and/or contraction of the various other elements of the apparatus. The centering protrusions, on the other hand, assure the alignment of the bushing lumens with the respective gates.

Typically, the centering protrusions are formed of titanium, or some other low thermal conductivity material. Further, the contact area between the protrusions and the bushings is kept small. Still further, those contact areas are substantially spaced from the gate areas. These features minimize the detrimental effects of direct thermal contact between the bushings and the mold.

In some cases, bushings have been developed which include a bore defining portion having a small gate at its bottom end. In such cases, the mold maker is relieved of the responsibility of creating components which must be machined to very close tolerances for receipt of the bushings. Instead, the mold is simply provided with appropriately sized outer cavities which may either open directly into the inner article formation cavity of the mold, or may be connected to the article formation cavity by a separate gate. In both cases, the bore defining portions of the bushings are press-fit into, or otherwise secured within, the appropriately sized outer cavities so as to effectively become part of the mold.

It further is well known in the art that the relative geometric configurations of, and the composition of, the bushing tip and the mold in the vicinity of the gate must be carefully selected and controlled in conjunction with the material being molded. This is particularly the case in open bore type injection molding apparatus.

Specifically, it is these features which allow the mold to pull heat from the gate area during reduced melt pressure portions of the injection molding cycle. Therefore, it is the appropriate balance among these features which allows an approximation of the optimum, axially extending thermal gradient (profile) within the melt located in the gate area to be provided. This thermal profile, during the low pressure portion of the injection molding cycle, determines the size and shape of the so-called "vestige" which is left projecting from the completed article upon its ejection from the mold.

Without such control, undesirable stringing of the melt material between the gate and the article at the break point between the molten material and the so-called "vestige"; drooling of melt material from the gate outlet subsequent to formed article ejection from the mold; and/or freeze off of the gate area may take place. These events may result in ruined parts, material waste, the need for unnecessary trimming operations and/or undesirable machine down time to free the various channels of frozen (i.e., solidified) melt material.

It has been found that computer modeling by a method known as finite element analysis may be used to advantage in making the above-referred-to selections. This is particularly important because the relationships between the various parameters which determine thermal gate control are not linearly related to one another. Accordingly, the ultimate effect upon overall apparatus operation occasioned by varying the material of a particular component defining the gate area, or the dimensions thereof, cannot be readily predicted.

Further, in some applications it is deemed critical not only to avoid stringing and/or drooling from the gate area, and gate freeze off, but also to minimize the size of the "vestige". In conventional valve gated apparatus, this is accomplished by the distal end of the axialy reciprocating valve pin filling the gate volume after each "shot" of melt material. In open bore apparatus, on the other hand, it has been found to be advantageous to provide the bushings with a heated, generally cone shaped tip. The pointed end of this tip is adapted to project into the gate so as to provide additional heat input to the center of the gate channel. Heretofore, this has been achieved in various ways with varying degrees of success.

In one such alternative, elongate, heated probe elements (sometimes referred to as "torpedos") having pointed distal ends have been axially located in the melt flow lumens of the bushings. In such apparatus, the pointed ends of the probes extend beyond the distal ends of the bushings so as to reside in the gates. Such probe elements, however, cause undesirable non-uniformities in melt material flow. Specifically, the melt is forced to flow through the bushing lumens in the annular channel surrounding the probe. This creates serious and undesirable pressure losses along the length of the bushing lumen.

Further, other problems arise because of the fact that such probes are generally heated by electrical resistance heaters. Electrical resistance heaters inherently display a temperature gradient along their lengths. Accordingly, their use creates regions which are hotter, and regions which are colder, than the optimumally desired melt temperature along the length of the bushing lumen. Therefore, it is necessary to adjust the temperature output from the colder regions so as to assure that melt freeze off in those regions does not occur. As a result, however, the temperature of the hotter regions is also increased. This may cause unacceptable melt material degradation or burning in the hotter regions.

Another alternative is to taper the distal end of the bushing so as to form a distally pointed cone shaped section. This may be accomplished by mounting an insert containing an axially disposed, solid, cylindrical element having a pointed end in the distal end of the bushing lumen such that the pointed end of the cylindrical element extends through the gate area and into the gate. It also may be accomplished by forming the distal end of the bushing itself in the shape of a distally pointed cone which is sized for extension through the gate area and into the gate of the assembled apparatus.

The first of these alternatives forces the melt to flow through an annular passageway in the insert, and thereby creates non-uniformities in the melt flow and undesirable pressure losses. Further, in one form of such an apparatus, a helical baffle has been located between the cylindrical element and the side wall of the insert's lumen in an attempt to minimize the non-uniformities of melt flow through the insert. The baffle, however, imparts a non-axial component to the distally directed melt flow. Conventional injection molding operations are based upon a substantially totally axially directed and homogeneous melt flow through the gate.

Further, the helical baffle tends to create "dead spots" along the melt flow path. Melt material may accumulate in these "dead spots". Accordingly, the presence of the baffle can lead to the introduction of degraded, burned, solidified or off color melt material into the main melt flow through the gate area and the gate. Such material may clog the gate. It also may ruin completed molded articles by permiting substandard material or streaks of off color melt to be incorporated into such articles. The streaking problem is particularly troublesome following a change in the color of the source melt material.

In the second of the latter alternatives, the distally pointed section of the cone shaped section of the bushing resides in the gate area and gate of the assembled apparatus. A plurality of substantially equally, circumferentially spaced portals extend through the side wall of the cone shaped section adjacent to its larger end so as to connect the bushing lumen with the gate area. The melt material flowing through the bushing lumen divides adjacent to the distally pointed section and exits the bushing through the portals.

Thereafter, the melt material ejected from each portal flows primarily directly and distally toward the gate. The melt material, however, also flows secondarily in a spreading manner circumferentially along the outer surface of the cone shaped bushing tip so as to ultimately fill at least the gate area of the apparatus. When this occurs, melt material may accumulate in dead spots located in the spaces between the portals (i.e., in regions adjacent to the larger end of the conical tip between the primarily distally flowing melt streams from the respective portals). This in turn may lead to degraded, burned, substandard or off color melt entering into the main melt stream so as to cause unacceptable streaking or other defects in completed articles over a substantial period of time.

It also has been found that the melt flow in the second of the latter alternatives results in the presence of unacceptable so-called "striation lines" in completed molded articles. These "straition" lines radiate in spaced relation to one another outwardly from the vestige protruding from the outer surface of the article. The spacing of these "striation" lines corresponds to the locations of planes which are perpendicular to the outer surface of the cone shaped distal tip and which extend radially outwardly from the longitudinal axis of the bushing substantially midway between each pair of portals.

The reasons for the formation of these "striation lines" are not fully understood. The cone shaped bushing tip is heated, but it also resides in the thermally controlled gate area wherein the transition of the melt from a molten, substantially liquid form to a solidified form occurs. It is theorized, therefore, that due to the primarily distal direction of the flow of melt material from each portal in the thermally controlled transition zone, the molecular chains of the polymeric melt material tend to become generally axially aligned with one another as the material flows distally along, and spreads circumferentially around, the cone shaped tip. Therefore, when the circumferentially spreading portions of the melt flow come into contact with one another, they tend to weld (or "knit") together in a manner in which the aligned molecules cause the formation of a weak joint. This is to be distinguished from the more desirable homogeneous merging of the molecules with one another in a manner in which the molecular chains of the respective speading portions of the melt flow intertwine with one another. This welding is believed to be the source of the undesirable "striation lines".

Still further, until recently, injection molding apparatus wherein both (i) the volume of the air gap between the outer bushing surface and the adjacent side wall of its associated outer mold cavity is maximized, and (ii) the volume adjacent to the gate area into which molten melt material is allowed to flow during pressurized portions of the injection molding cycle is minimized, were not available in a single apparatus. This is because it was not believed to be possible to locate a seal in the gap between the bushing and the mold in close proximity to the gate area. Specifically, it was conventionally believed that such a seal would create a heat passageway between the bushing and the mold which would detrimentally affect the thermal control of the gate area and gate. Accordingly, since in conventional injection molding apparatus at least a substantial portion of the gap between the outer surface of the bushing and the side wall of the outer mold cavity contained a material less insulative than air, completed part quality was compromised.

In addition, due to the compression/decompression pumping forces applied to melt material located in the gap between the bushing and the mold by the cyclical application and release of pressure on the melt material flowing through the apparatus, the main melt flow was subject to contamination by degraded melt material or pieces of solidified melt material. This problem was particularly significant in those instances wherein the color of the source melt material was changed. The reason for this was that until the melt material of the first color located in the space between the bushing and the mold was cleared by the above-referred-to pumping action, completed articles formed by the apparatus contained streaks of the first melt color. Such streaked articles obviously had to be disposed of as waste. Also, in severe cases, the apparatus had to be disassembled to clear the apparatus of off color melt material.

The latter problem has recently been solved to the extent possible by the invention of our co-pending U.S. patent application Ser. No. 08/105,799, filed Aug. 12, 1993. That invention provides a thin-walled metallic seal in close proximity to, and surrounding, the gate area of the apparatus without introducing adverse affects upon the thermal control of the gate area. Hence, the number of operational cycles required to clear an apparatus including a conventional cone tip bushing and the above-referenced seal of off color melt (e.g., for the apparatus to stop producing streaked output articles) was reduced by an order of magnitude. For example, in one case completed article streaking ceased after about 150 apparatus cycles of a conventional apparatus alone, while in an equivalent apparatus containing a seal in accordance with the invention of our above-referenced patent application streaking ceased after about 50 apparatus cycles.

OBJECTS OF THE INVENTION

Accordingly, it is an object of the present invention to provide an improved cone tip bushing for injection molding apparatus.

It is also an object of the present invention to provide an injection molding apparatus including a cone tip bushing adapted to produce completed molded articles with no striation lines therein.

It is another object of the present invention to provide an injection molding apparatus adapted to produce molded articles having very small vestiges protruding from the outer surfaces thereof.

Still another object of the present invention is to provide an injection molding apparatus wherein the number of apparatus cycles required to clear the apparatus of a previous source color melt material so as to avoid streaking in completed articles is reduced by an order of magnitude in comparison to prior apparatus.

Further, it is an object of the present invention to provide a cone tip bushing for use in an injection molding apparatus which does not impart a significant non-axial component to the flow of melt material passing through the gate area.

Yet another object of the present invention is to provide an injection molding apparatus including a bushing, a bushing insert engaging the distal end of the bushing, and a cone tip element located in the insert so as to project distally outwardly therefrom into the mold gate.

Yet a further object of the present invention is to provide an injection molding apparatus including a cone tip bushing wherein melt material is conveyed to the proximal end of the bushing's cone shaped tip in the form of a substantially homogeneous, totally distally flowing annular mass.

SUMMARY OF THE INVENTION

These, and other objects of the present invention, are accomplished by the provision of a novel cone tip bushing for use in an injection molding apparatus. The cone tip of the invention may be formed (1) integrally with the bushing; (2) as an insert adapted for co-operative function with the distal portion of the side wall of the bushing lumen; (3) as a separate assembly adapted for mounting at its proximal end in the distal portion of the bushing lumen; or (4) otherwise; all without departure from the invention in its broadest aspects.

As noted above, it has been found to be convenient in the prior art to eject the flow of melt material from the interior lumen of a cone tip bushing to the exterior surface thereof through portals in the wall of the larger section of the bushing's cone shaped tip. This practice directs the melt flow directly into the thermally controlled gate area of the injection molding apparatus, and has been found to create undesirable "striation lines" in completed articles. Further, such apparatus has been found to create "dead spots" wherein melt material may undesirably accumulate. It also has been discovered, however, that the point(s) of ejection of the melt flow from the interior bushing lumen are not necessarily required to be located as suggested by the prior art.

Specifically, the present invention provides a novel cone tip bushing configuration in which the molten melt material stream in the axial bushing lumen is ejected into the innermost portion of a distally facing, annular cavity. This location of melt flow ejection is situated proximally of the conical portion of the bushing tip, and of such other bushing portions as may participate significantly in the thermal control of the gate area and gate. In addition, means are provided for assuring that a substantially homogeneous, and substantially totally distally directed, annular melt flow passes along the conical tip of the bushing into the article formation cavity of the mold through the gate area and gate. Still further, the melt flow path within the annular cavity is so configured that potential areas of melt accumulation (i.e., "hang up") during injection molding operations are minimized. Accordingly, "striation lines" and excessive streaking of substandard, degraded or off color melt in completed articles are avoided.

Still more particularly, the bushing tip of the invention may be formed of beryllium/copper alloy or some other highly heat conductive material, and heated in a conventional manner. Further, the bushing tip includes a longitudinal axis, a proximal portion; a conically shaped distal portion; a melt distribution portion connecting the proximal and distal portions; and a wall portion.

The proximal portion is centered on the longitudinal axis, has a first diameter, and contains an axial lumen extending therethrough. The conical distal portion is also centered on the longitudinal axis, and has a maximum diameter smaller than the first diameter of the proximal portion. The wall portion closely surrounds at least a distal part of the melt distribution portion, and may surround a proximal part of the conically shaped distal portion as well, if desired.

The melt distribution portion includes means for conveying a melt stream from the internal lumen of the proximal portion into a distally facing annular cavity formed between the outer surface of a distal part of the melt distribution portion and the wall portion. In addition, means for assuring that the melt stream is ejected distally from the annular cavity in the form of a substantially homogeneous, totally distally directed annular mass are provided.

In the preferred embodiments, the melt distribution portion includes a proximal section, a middle section and a distal section. The proximal section has a transverse cross-section which substantially corresponds to the transverse cross-section of the proximal portion of the tip. It also contains an axial bore which is aligned with, and communicates with, the axial lumen of the the bushing.

Distally of the proximal section, the middle section defines a radially outwardly and distally extending portal which connects the closed end of an internal, axial blind bore (which communicates at its open end with the axial bore of the proximal section) to the proximalmost part of the outer surface of the middle section. The outer surface of the middle section defines at least one distally facing shoulder having an outer edge and an inner edge. The outer edge of the shoulder extends helically and distally around and along an axial projection of the proximal section. The inner edge of the shoulder, on the other hand, is located on an axial projection of the largest diameter of the conically shaped portion of the tip. In addition, the surface of each of the at least one distally facing shoulders tapers radially inwardly and distally.

The distal section of the melt distribution portion extends distally from the middle section. This distal section has a transverse cross-section which corresponds to the transverse cross-section of the proximal end of the conically shaped distal portion of the tip.

It also has been found to be beneficial to provide melt flow facilitation means associated with the distally facing shoulders of the middle section of the melt distribution portion. In the preferred embodiments, these melt flow facilitation means take the form of an external groove (or grooves) extending perpendicularly into the shoulder face(s) and distally along the path(s) defined thereby.

In such cases, it has been found that the creation of a uniform annular mass of melt material exiting from the melt distribution portion onto the conically shaped portion of the tip may be controlled by (i) varying the pitch angle of the groove(s) (i.e., its angle relative to the longitudinal axis) along its distally extending path; (ii) varying the groove depth along its distally extending path; (iii) varying the separation of the wall from the open end of the groove(s) along its/their distally extending path(s); (iv) varying the number of portals connecting the blind bore to the base of the groove or grooves; and (v) varying the number of grooves and shoulders provided. In the preferred embodiments, variables (i) and (iii) above are held constant, while control is maintained by appropriate selection of values for variables (ii), (iv) and (v).

For example, in one embodiment of the invention a single groove extends from the portal distally and circumferentially 360° around the middle section of the melt distribution portion. In another embodiment, a pair of grooves extend from a single portal distally and circumferentially 180° in opposite directions around the middle section of the melt distribution portion. Further, in each case the distalmost ends of the grooves are flared outwardly so as to smoothly merge with the outer surface of the distal section of the melt distribution portion.

As alluded to above, other groove configurations are contemplated to be within the scope of the invention in its broadest aspects. The important feature of the invention is that the groove configuration, or other melt flow facilitation means, selected, along with the disposition of the distally facing shoulder(s) of the middle section of the melt distribution portion, be such that the melt stream flows uniformly and distally from the portal so as to ultimately exit the annular cavity as a homogeneous and totally distally flowing annular mass.

BRIEF DESCRIPTION OF THE DRAWINGS

These and other features, advantages and objects of the present invention will become clear to those skilled in the art in view of the following detailed description of the preferred embodiments thereof taken in conjunction with the appended drawings in which:

FIG. 8 is an enlarged, illustrative, sectional, side elevational view of a cone tip for a bushing in accordance with the present invention;

FIG. 9 is a side, elevational view of the inner element of the cone tip for a bushing shown in FIG. 8;

FIG. 10 is an illustrative, side elevational view, partially cut away, of the inner element of the cone for a bushing shown in FIG. 9 rotated 90° on its longitudinal axis;

FIG. 11 is a top, sectional view of the inner element of the cone tip for a bushing shown in FIG. 10 taken along the line 11—11;

FIG. 13 is an enlarged, illustrative, side elevational view of an alternative inner element of a cone tip for a bushing in accordance with the present invention;

FIG. 14A is an illustrative, side elevational view, partially cut away and rotated 90° about its longitudinal axis, of the alternative inner tip element shown in FIG. 13;

FIG. 14B is a top view of the inner tip element shown in FIG. 14A taken along the line 14A—14A;

FIG. 15 is an enlarged, illustrative, sectional, side elevational view of a cone tip for a bushing using an alternative inner element similar to that shown in FIG. 13;

DETAILED DESCRIPTION OF PREFERRED EMBODIMENTS

Figure 1:
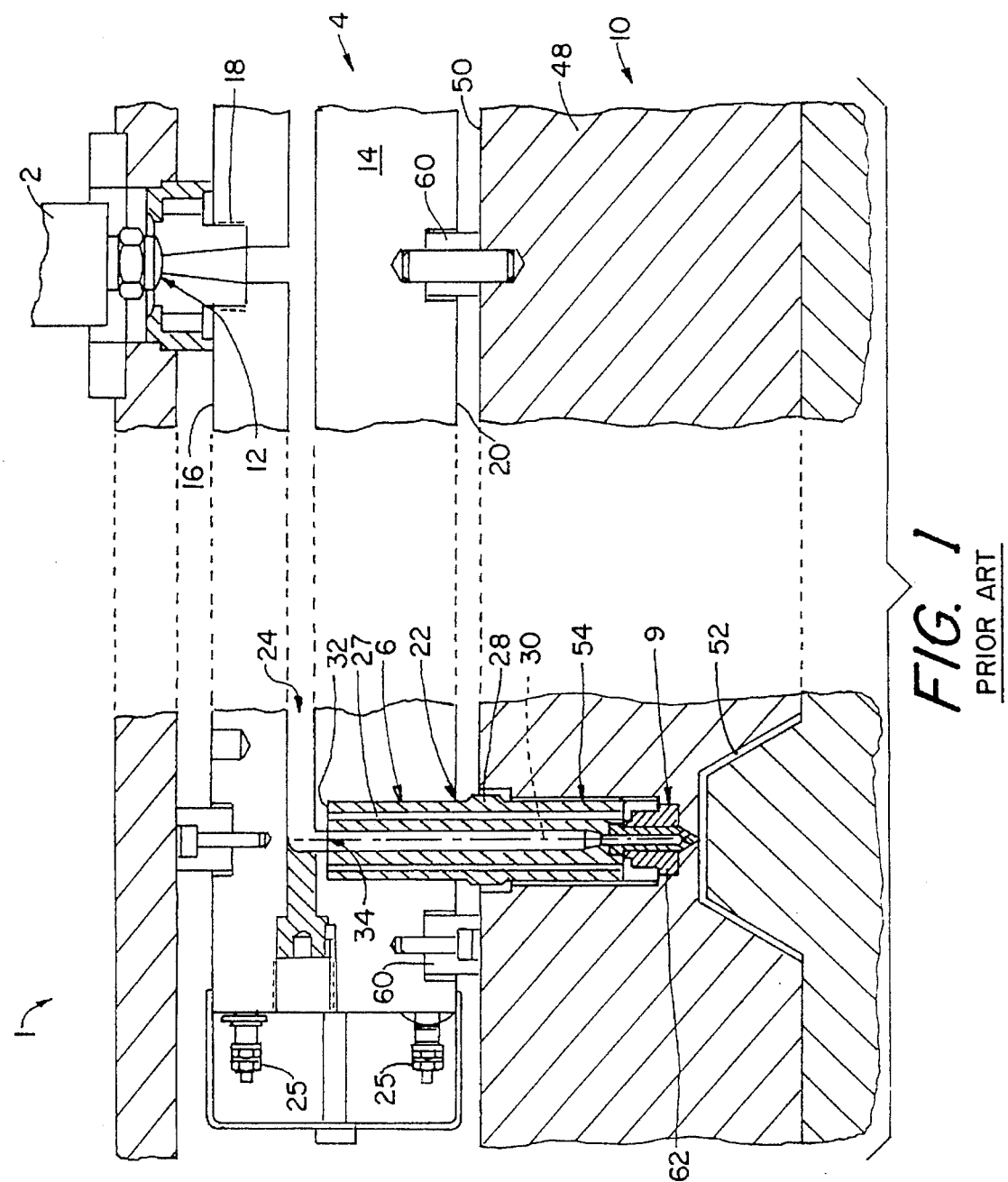
FIG. 1 is an illustrative, side elevational view, partially cut away and partially in section, of an injection molding apparatus including a conically shaped bushing tip extending into the gate of the mold in accordance with the prior art.
Figure 2:
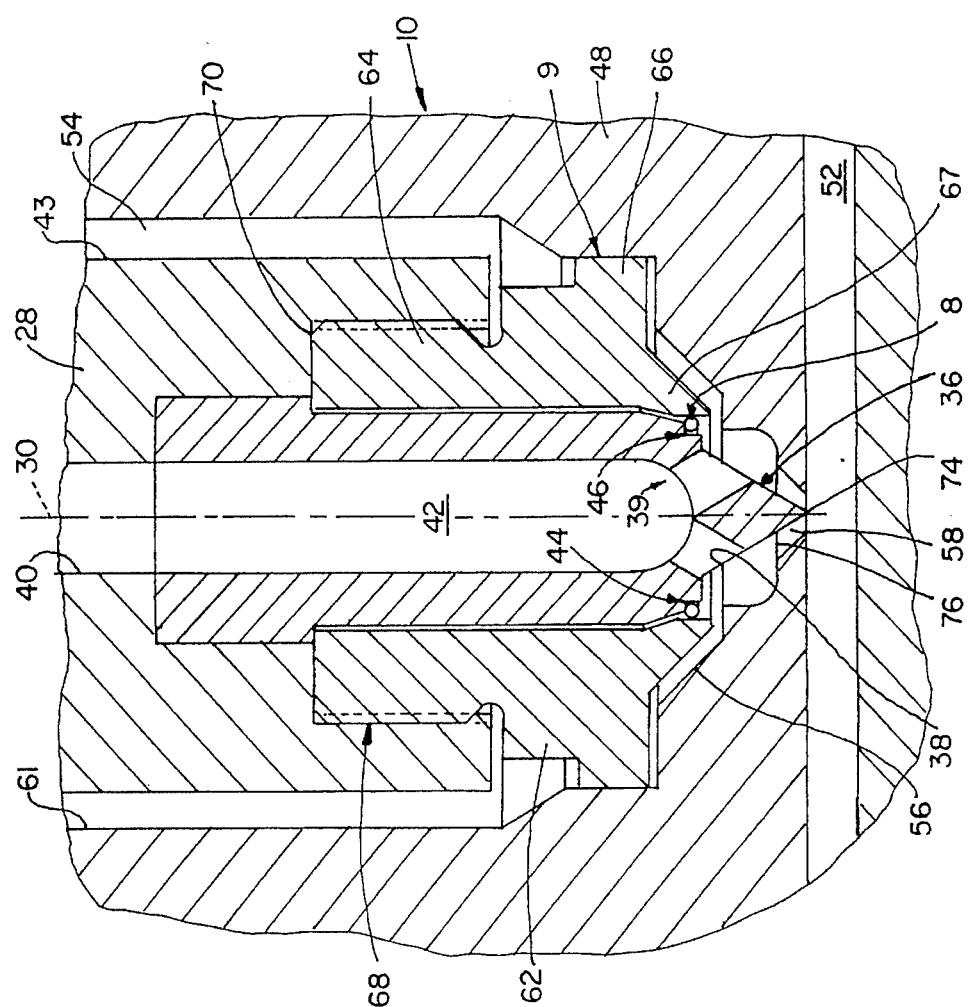
FIG. 2 is an enlarged, illustrative, sectional, side elevational view of the portion of the apparatus of FIG. 1 which surrounds the gate area and gate.
Figure 3:
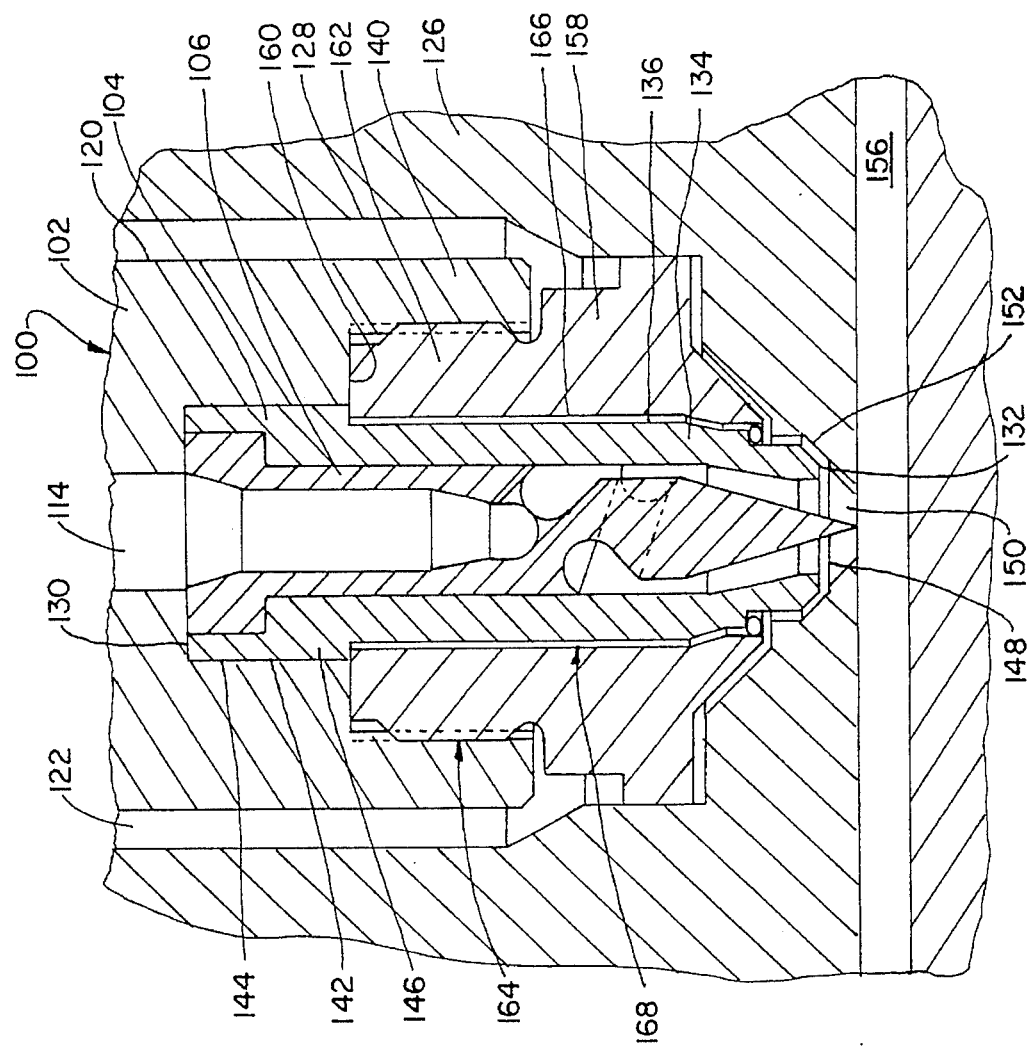
FIG. 3 is an enlarged, illustrative, sectional, side elevational view showing the elements of an injection molding apparatus in accordance with the present invention which surround the gate area and gate.
Figure 4:
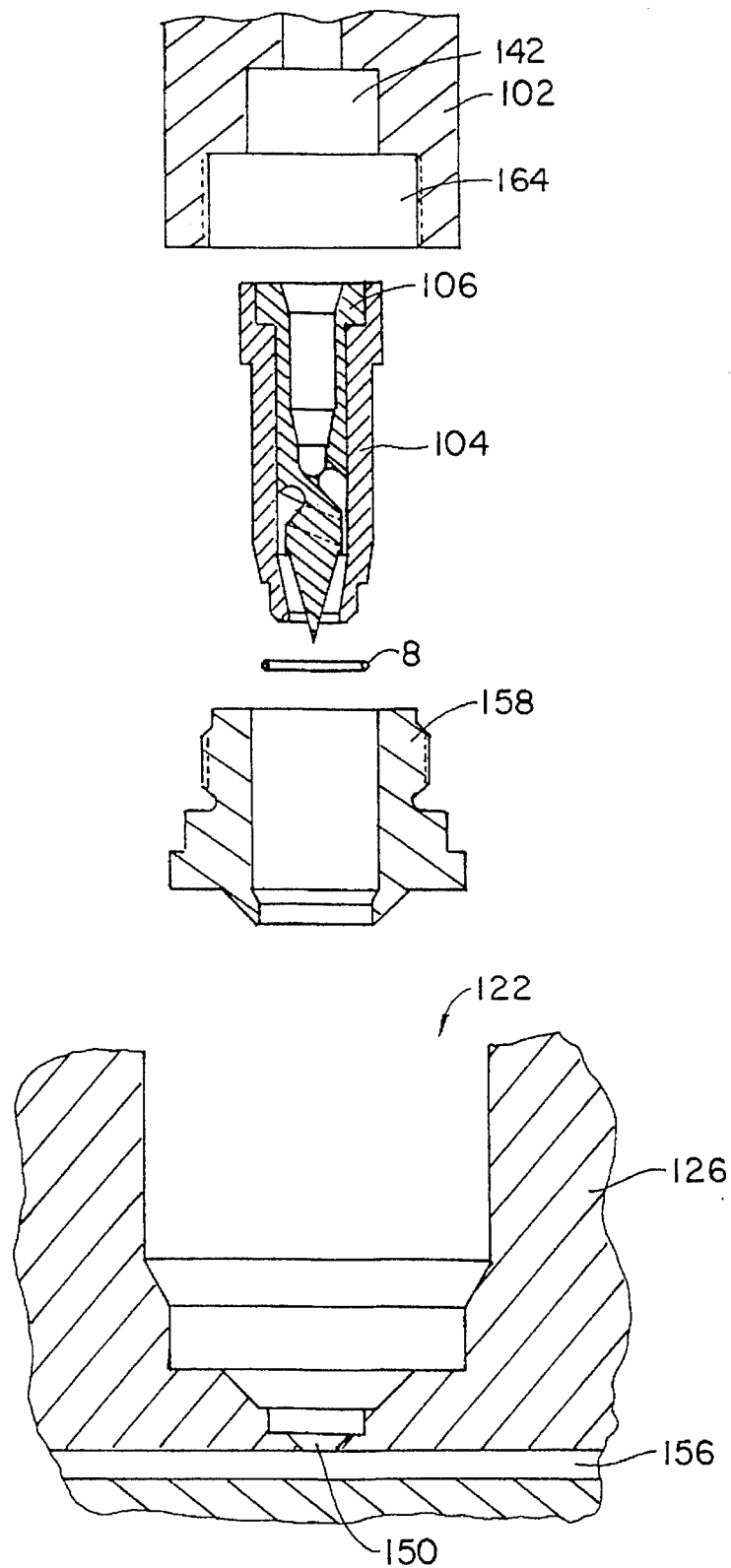
FIG. 4 is an exploded view of the elements shown in FIG. 3.

Referring now to the drawings (wherein some of the cross-hatching of the sectional views has been omitted for clarity), and particularly to FIGS. 1 and 2, there is shown (i) an illustrative, side elevational view, partially cut away and partially in section, of an injection molding apparatus including a conically shaped bushing tip extending into the gate of the mold in accordance with the prior art; and (ii) an enlarged, sectional, illustrative, side elevational view of the portion of the assembled apparatus of FIG. 1 which surrounds the gate area and gate. As will more fully hereinafter appear, the present invention utilizes the basic structure shown in FIGS. 1 and 2, but with a new and novel cone tip for the bushing (compare FIG. 2 with FIGS. 3–4).

The basic apparatus, generally indicated at 1, includes a source of molten material 2, a heated manifold 4, a heated bushing 6, sealing means 8, tip centering means 9 and a cooled mold 10.

More particularly, source 2 is adapted to supply molten material to its outlet orifice 12 intermittently and under variable pressure. Accordingly, it will be understood by those skilled in the art that any one of numerous plastic injection machines (such as a screw driven device adapted to convert plastic pellets into molten plastic) may supply preselected quantities of molten material to output orifice 12 of source 2 under preselected pressures, at preselected temperatures, and at preselected intervals.

Manifold 4 comprises a block 14 of highly heat conductive metal having an upper surface 16 defining at least one first opening 18, a lower surface 20 defining at least one second opening 22, and at least one channel 24 connecting one of the first openings 18 to one or more of the second openings 22. The output orifice 12 of the source 2 communicates with the first openings 18 in the manifold 4 so as to allow molten material from the source 2 to flow therefrom into, and through, runner channels 24. In addition, manifold 4 includes heating means, representatively shown as electrical resistance heaters 25 controlled by thermocouples (not shown), for maintaining manifold block 14 at a temperature such that the material flowing therethrough remains in a molten (i.e., substantially liquid) state.

Bushing 6 also is made of highly conductive metallic material, such as beryllium/copper alloy, and is heated in a conventional manner by cartridge heaters, heating collars, heat pipes or any other convenient means generally indicated at 27. Bushing 6 generally includes (i) an elongate shaft member 28 having a longitudinal axis 30, (ii) an upper end 32 defining a third opening 34, (iii) a lower, conically shaped end 36 defining a plurality of circumferentially spaced, fourth openings 38 in its proximalmost portion 39; (iv) a wall 40 defining an internal lumen 42 connecting third opening 32 to fourth openings 38, and (v) an outer surface 43.

Portion 44 of outer surface 43 adjacent conically shaped end 36 defines seal engagement means 46 designed to engage sealing means 8. Sealing means 8 and seal engagement means 46 are contemplated to be of the type shown and described in detail in our co-pending U.S. patent application Ser. No. 08/105,799 filed on Aug. 12, 1993. Further, it will be understood by those skilled in the art that bushing 6 may be formed as a unitary structure, or as a combination of interlocking elements as shown in FIGS. 1 and 2.

Mold 10 comprises a block 48 of highly heat conductive metal which is cooled. In the preferred embodiments, mold cooling may be provided by cold liquid flowing through channels (not shown) in block 48, heat pipes (not shown) which communicate with an extenal heat sink (not shown), or any of several other well known cooling means. Further, mold 10 has an upper surface 50 which faces lower surface 20 of manifold 4. In addition, mold 10 defines at least one internal article formation cavity 52. Each article formation cavity 52 is connected to upper surface 50 by an outer cavity 54 extending into upper surface 50 to a permissably contoured base 56, and a gate 58 extending from base 56 to article formation cavity 52.

Thermally resistant support pads 60 are located between lower surface 20 of hot manifold 4 and upper surface 50 of cooled mold 10. Support pads 60 serve to thermally and mechanically separate hot manifold 4, which typically operates at between about 350° F. and about 750° F., from cold mold 10, which typically operates at between about 30° F. and about 200° F.

In the assembled form of the apparatus, bushings 6 are suspended substantially centrally within outer cavities 54 in upper surface 50 of mold 10. This suspension is such that lumen 42 is in substantial alignment with gate 58 connecting base 56 of outer cavity 54 with the internal article formation cavity 52 of mold 10. It is also such that outer surface 43 of bushing 6 is closely spaced from side wall 61 and base 56 of outer cavity 54. Specifically, the spacing between portion 44, tip centering means 9, and base 56 of outer cavity 54 is selected to be smaller than the distance seal means 8 extends outwardly from bushing 6 (i.e., on the order of less than about 0.010 inches).

If desired, bushing centering means 9 may extend upwardly from base 56 of outer mold cavity 54. Bushing centering means 9 may comprise an annular wall (not shown) formed integrally with outer mold cavity 54 surrounding gate 58 and extending axially and proximally from base 56 of outer mold cavity 54. Alternatively, as shown in FIGS. 1–4, bushing centering means 62 may comprise a separate cylindrical element 62 including an annular wall 64 and a flange 66 extending radially outwardly from wall 64 adjacent to distal wall end 67. Flange 66 is adapted to tightly engage sidewall 61 of outer mold cavity 54. Bushing centering means 62 is typically formed of a low thermal conductivity metallic material such as titanium. Further, in the event that a centering means 62 is utilized, an annular recess 68 is provided in bushing 6 at a location proximal of lower conically shaped portion 36 to receive the proximal end 70 of annular wall 64.

Figure 5:
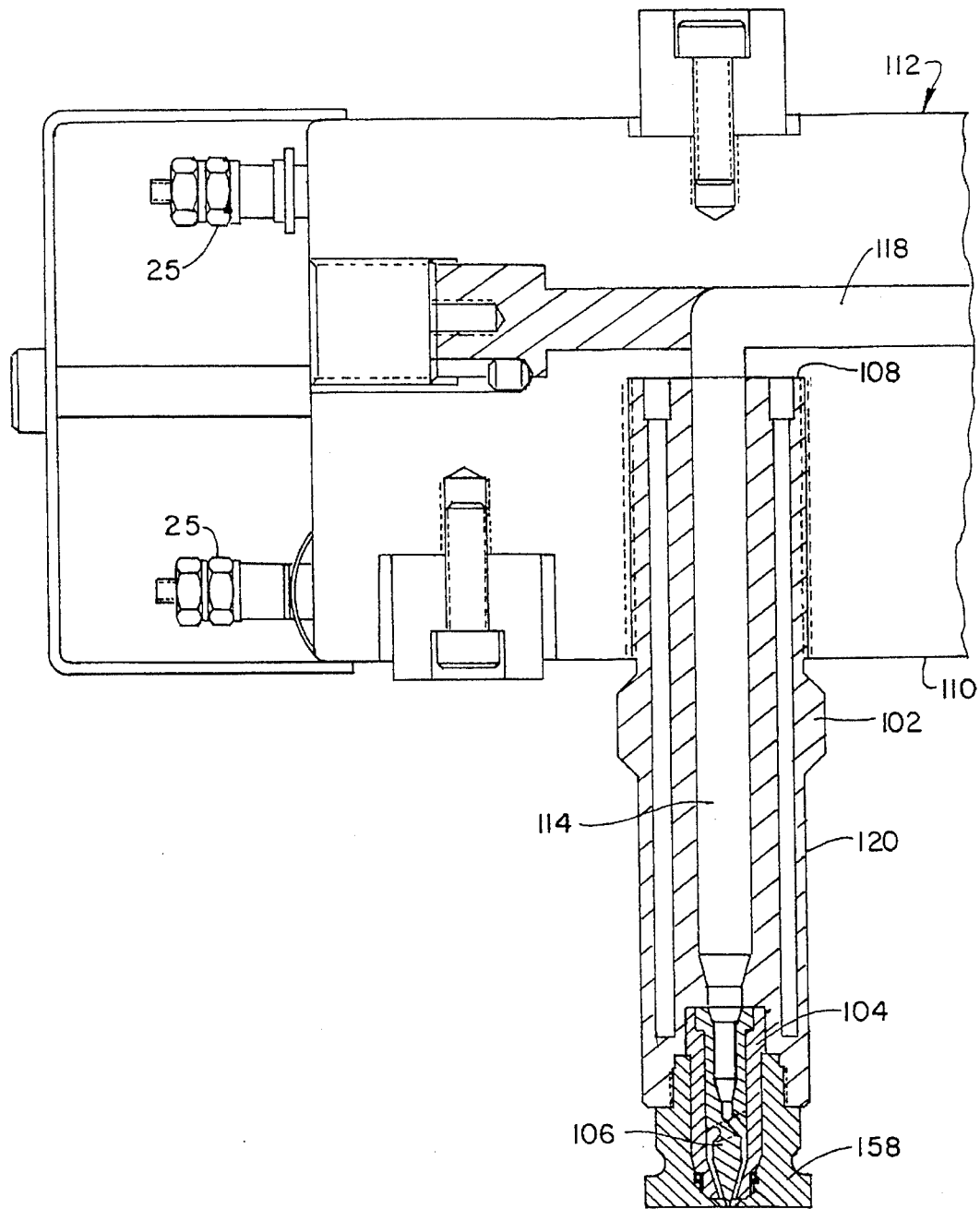
FIG. 5 is an illustrative, side elevational view, partially cut away and partially in section, showing a manifold and bushing in accordance with the present invention wherein the bushing includes a bore defining element.
Figure 6:
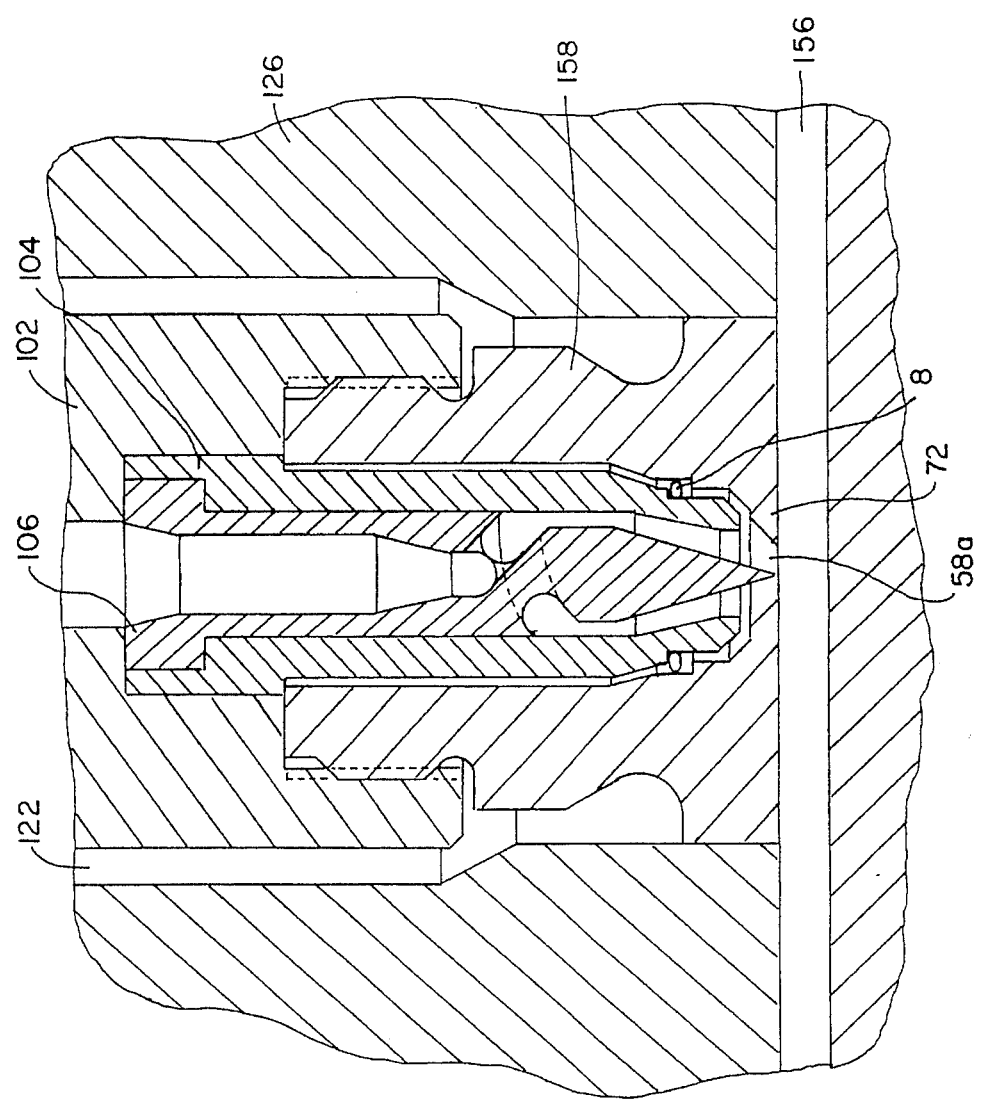
FIG. 6 is an enlarged, sectional, side elevational view of the tip of the bushing shown in FIG. 5 located in an outer cavity of a mold which does not include its own gate.
Figure 7:
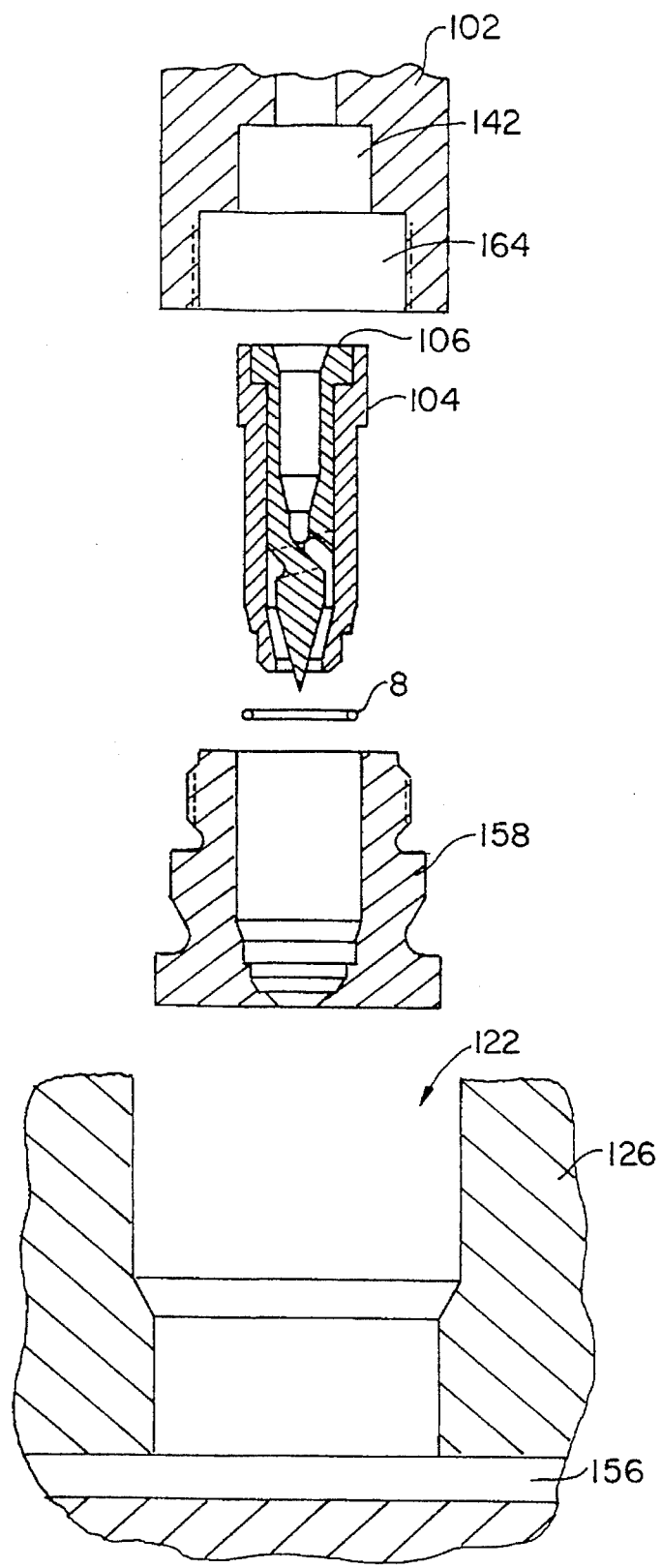
FIG. 7 is an exploded view of the elements shown in FIG. 6.
Figure 12:
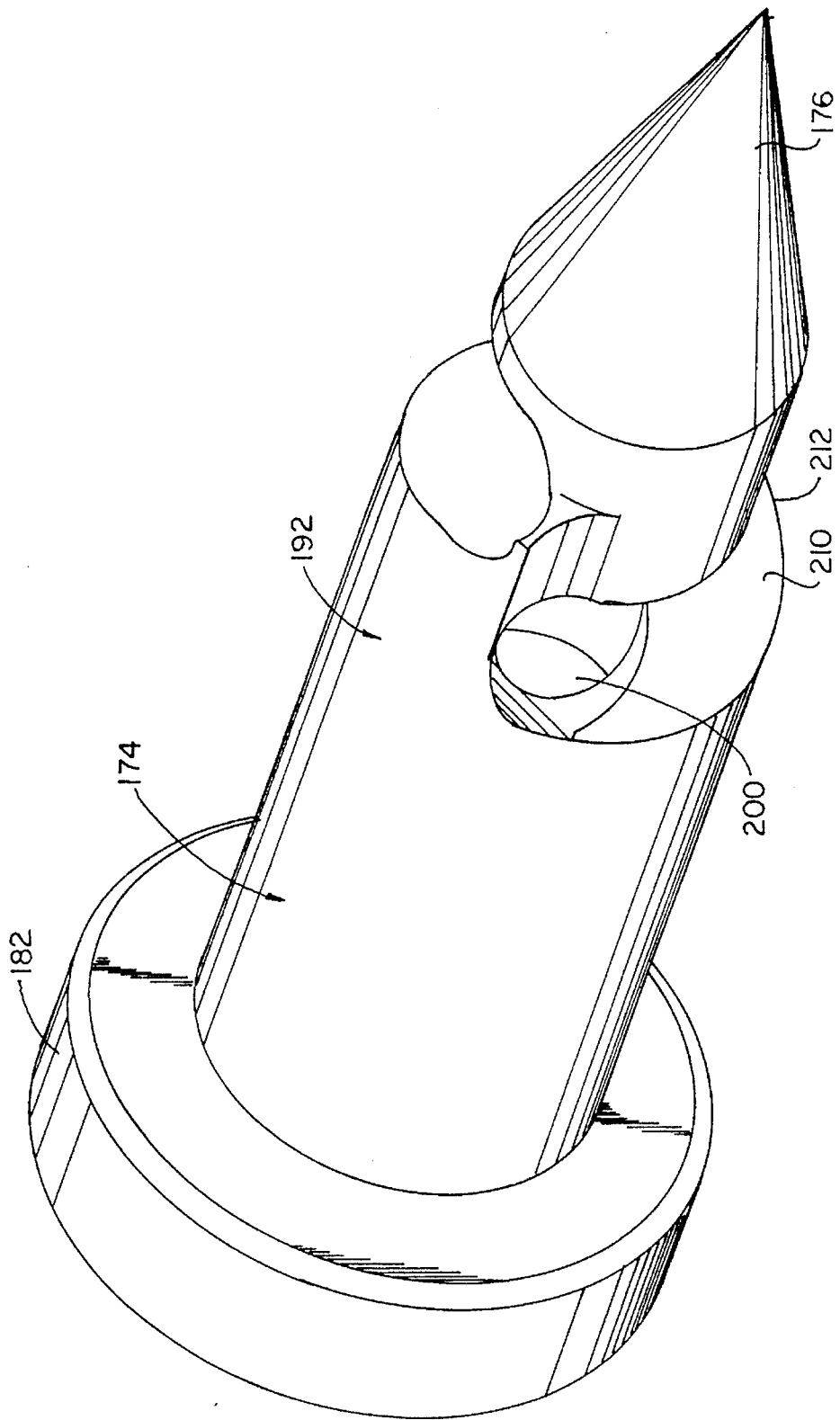
FIG. 12 is an illustrative perspective view of the inner element of the cone tip for a bushing shown in FIG. 8.

Accordingly, outer mold cavity 54 may be formed in mold 10 directly. Outer mold cavity 54 might also be formed in two sections, however, one in mold 10 and the other in centering element 62 (see FIGS. 1–7). In such a case, element 62 may be adapted to be carried by bushing 6 and to fit tightly within outer mold cavity 54 so as to effectively become a part of mold 10. In such a case, outer mold cavity 54 might define a gate 58 which is aligned with a corresponding gate 58a formed by a flange 72 extending radially inwardly adjacent to distal end 67 of element 62. Similarly, as shown in FIGS. 5–7, outer mold cavity 54 might open directly into article formation cavity 52 in a manner adapted to tightly receive element 62 without the presence of an additional gate 58 in mold 10. Further, outer cavity 54 might also be formed in a plate (not shown) adapted to be placed on top of mold 10 so as to substantially constitute an extension of mold 10, all without departure from the invention in its broadest aspects.

In order to minimize the size of the vestige extending outwardly from the outer surface of completed articles, it is well known in the art that lower tip portion 36 of bushing 6 may be formed in the shape of a distally pointed cone (see, FIGS. 1–2). In such a case, pointed end 74 of tip portion 36 extends distally outwardly from the distalmost end of wall 40 of bushing 6 and centrally into gate 58. Since bushing 6 is heated, this location of pointed end 74 transmits heat to the central portion of gate 58. This in turn alters the thermal gradients in the gate area and gate. These altered thermal gradients cause the vestige break point to be moved distally relative to its location in an injection molding apparatus not including a conical bushing tip. Specifically, the vestige break may be made to occur within gate 58, rather than within a gate area located between gate inlet 76 and openings 38 in bushing 6. As mentioned above, however, an apparatus such as that depicted in FIGS. 1–2 has been found to cause striation lines in completed articles, and to include melt material accumulation locations disposed circumferentially substantially midway between openings 38.

As alluded to above, in the exemplary preferred embodiments of the present invention (see FIGS. 3 through 7), the basic structure of the injection molding apparatus is substantially as described above. Specifically, each bushing 100 is adapted for location in the injection molding apparatus at substantially the same location and in substantially the same manner as bushing 6 described above. Each bushing 100 also is heated in a conventional manner. Each bushing 100, however, includes an elongate, hollow shaft 102; an extension member 104; and an insert member 106.

The proximal end 108 of shaft 102 is attached to bottom surface 110 of a heated manifold 112 in a conventional manner (see FIG. 5). Accordingly, lumen 114 of bushing 100 communicates with a source (not shown) of molten melt material through an internal runner channel 118 of manifold 112. Further, the outer surface 120 of shaft 102 extends into an outer cavity 122 in the upper surface of a cooled mold 126 in spaced relation to sidewalls 128 thereof.

Extension member 104 is a substantially cylindrical element which has an open proximal end 130, an open distal end 132, and a wall 134 (see FIGS. 7 and 8). Wall 134 has an outer surface 136, and defines an internal, axial lumen 138 extending between open proximal end 130 and open distal end 132. Proximal end 130 of extension member 104 is affixed within lumen 114 of shaft 102 adjacent to shaft distal end 140. More particularly, a first counterbore 142 extends substantially axially into shaft distal end 140. A peripheral flange 146 extends radially outwardly from, and surrounds, extension member 104 adjacent open extension member proximal end 130. First counterbore 142 is sized to securely receive outer surface 144 of peripheral flange 146.

Extension member 104, therefore, extends axially outwardly from shaft distal end 140 to open extension member distal end 132. Open extension member distal end 132 is adapted to be located substantially adjacent to inlet 148 of gate 150 connecting base 152 of outer mold cavity 122 to internal article formation cavity 156. More specifically, in the embodiments shown, a centering element 158, similar to centering element 62 described above, is provided. Proximal end 160 of sidewall 162 of centering element 158 engages a second counterbore 164 in shaft distal end 140—which second counterbore has a larger diameter, but shorter axial length, than first counterbore 142. Outer surface 136 of wall 134 is thereby spaced from inner surface 166 of lumen 168 through centering element 158 in a conventional manner.

Insert member 106 is attached at its proximal end 170 to proximal end 130 of extension member 104 so as to extend through the extension element's lumen 138. More particularly, insert element 106 includes a longitudinal axis 172, a proximal portion 174, a distal portion 176 and a melt distribution portion 178 connecting proximal portion 174 to distal portion 176. Proximal portion 174, distal portion 176 and melt distribution portion 178 are each longitudinally aligned with longitudinal axis 172.

More specifically, a third counterbore 180 extends axially into proximal end 130 and surrounding peripheral flange 146 of extension member 104. Proximal portion 174 of insert member 106 includes a radially outwardly extending peripheral flange 182 adjacent to its proximal end 184. Flange 182 is adapted to tightly engage third counterbore 180.

Proximal portion 174 also defines a longitudinal lumen 185 therethrough. In addition, proximal portion 174 has an outer transverse cross-section distal to flange 182 which substantially conforms to the transverse cross-section of lumen 138 of extension portion 104. Accordingly, proximal portion 174 forms a tight fit with lumen 138 when flange 182 engages third counterbore 180 as described above.

Lumen 185 of proximal portion 174 of insert member 106 is substantially cylindrical along the majority of its axial length. Adjacent to proximal end 184 of proximal portion 174, however, lumen 185 flares radially outwardly. Also, adjacent to distal end 132 of extension member 104 lumen 138 tapers slightly inwardly so as to form a section 186 defining substantially truncated conical volume.

Distal portion 176 may be solid, and has a distally pointed conical shape. Further, the diameter of the larger end 188 of distal portion 176 is selected so that an annular passageway 190 separates distal portion 176 of insert member 106 from the side wall of lumen 138 of extension member 104.

Melt distribution portion 178 includes a proximal section (generally indicated at 192) having a transverse cross-section which substantially corresponds to the transverse cross-section of proximal portion 174. Proximal section 192 also contains an axial bore 194 extending into proximal end 196 of melt distribution portion 178. Bore 194 is aligned with, and communicates with, lumen 185 of proximal portion 174.

Distally of proximal section 192, a middle section 198 defines a radially outwardly and distally extending portal 200 which connects the closed end 202 of an internal, axial blind bore 204 (which communicates at its open end 206 with bore 194 of proximal section 192) to the proximalmost part of the outer surface 208 of middle section 198. The outer surface 208 of middle section 198 defines at least one distally facing shoulder (shown in phantom at 210) having an outer edge 212 and an inner edge 214. Outer edge 212 of shoulder 210 extends helically and distally around and along an axial projection of proximal section 192. Inner edge 214 of shoulder 210, on the other hand, is located on an axial projection of the largest diameter of the conically shaped distal portion 176. In addition, each of the at least one distally facing shoulders 210 tapers radially inwardly and distally as it extends around middle section 192.

A distal section 216 of melt distribution portion 178 extends distally from the middle section 192. Distal section 216 has a transverse cross-section which corresponds to the transverse cross-section of the proximal end 188 of conically shaped distal portion 176.

It also has been found to be beneficial to provide melt flow facilitation means associated with distally facing shoulders 210 of middle section 192. In the preferred embodiments, these means take the form of an external groove (or grooves) 220 extending substantially perpendicularly into the shoulder face(s) 222 (shown in phantom in the drawings) and distally along the path(s) defined thereby. In such cases, it has been found that the creation of a uniform annular mass of melt material exiting from melt distribution portion 178 onto conically shaped distal portion 176 may be controlled by (i) varying the pitch angle of the groove(s) (i.e., its angle relative to the longitudinal axis) along its distally extending path; (ii) varying the groove depth along its distally extending path, (iii) varying the separation of the wall from the open end of the groove(s) along its/their distally extending path(s); (iv) varying the number of portals connecting the blind bore to the base of the groove or grooves; and (v) varying the number of grooves and shoulders provided. In the preferred embodiments, variables (i) and (iii) above are held constant, while control is maintained by appropriate selection of values for variables (ii), (iv) and (v).

More specifically, in one embodiment of the invention (see FIGS. 8 to 12) a single groove 220 extends distally and circumferentially 360° around middle section 192 of melt distribution portion 178. In another embodiment (see FIGS. 13 to 15), a pair of grooves 220 extend distally and circumferentially 180° in opposite directions around middle section 192 of melt distribution portion 178. In both alternatives, the depth of grooves 220 gradually decreases as they extend distally around middle section 192. Further, grooves 220 taper outwardly and distally to the outer surface 221 of distal section 216 at their distalmost ends 224.

In the completed assembly, therefore, molten melt material from the source flows through the runner channels 118 in the manifold 112, into and through the lumens 114 of the bushings 100, and thence into the lumen 185 of insert member 106. As the melt material is ejected from portal 200 in melt distribution portion 178 of insert member 106, it enters and overflows groove(s) 220 so as to fill the gap between middle section 192 of melt distribution portion 178 of insert 106 and the surrounding sidewall of lumen 138 of the extension member 104.

Grooves 220 serve a dual function. First, they provide a heated annular flow path for the melt material. Second, they facilitate the formation of a substantially uniform distal flow of melt material in the distally facing annular cavity between wall 134 of lumen 138 and middle section 192 of melt distribution portion 178. More particularly, it has been found that grooves 220 assist in the creation of a uniform, distally directed, annular flow extending a full 360° around insert 106. Hence, the melt flow reaches the distal section 216 of the melt distribution portion 178 in the form of an annular melt stream having a very small (if any) non-axial motion component.

From this point, the annular melt flow continues distally along the outer surface of distal section 216 of melt distribution portion 178 to conically shaped distal portion 176. During this portion of the flow, any non-axial component present in the melt stream is damped out to substantially zero.

Thereafter, the flow continues distally along the conically shaped distal portion 176 through the gate area, the gate and into the article formation cavity of the mold. Accordingly, unlike the melt flow induced by conventional cone tips, the melt flow in the present invention is directed around the conical tip portion of the bushing insert in a substantially totally distally moving (i.e., non-spreading), homogeneous annular mass. Specifically, the discontinuity in the flow arising from its movement from within the bushing to outside the bushing occurs within a heated portion of the apparatus spaced from the gate area. Accordingly, potential detrimental affects upon the thermal control of the gate area and the gate (or upon the melt flow) are avoided. In addition, the special configuration of the distally facing annular cavity, and the provision of a damping section assist in avoiding undesired non-axial components in the melt flow. Still further, the melt flow path is so configured that melt material "hang up" locations are minimized, thereby avoiding a potential source of substandard, degraded or off color melt in the main melt stream.

Finally, it is to be noted that the addition of a seal in accordance with our above-referenced prior application in proximity to the gate area results in reduced streaking in completed articles after a color change in the source melt by an additional order of magnitude over that possible using apparatus in accordance with the prior art. Specifically, as noted above in regard to an exemplary comparison, a conventional apparatus utilizing a conventional cone tip bushing cleared itself of a prior melt color in about 150 apparatus cycles. A similar apparatus utilizing a seal in accordance with our prior, copending U.S. patent application Ser. No. 08/105,799, filed Aug. 12, 1993, cleared itself of a prior melt color in about 50 apparatus cycles. An apparatus utilizing both the present invention and a seal in accordance with our above-identified prior application, however, cleared itself of a prior melt color in about 5 apparatus cycles.

Figure 16:
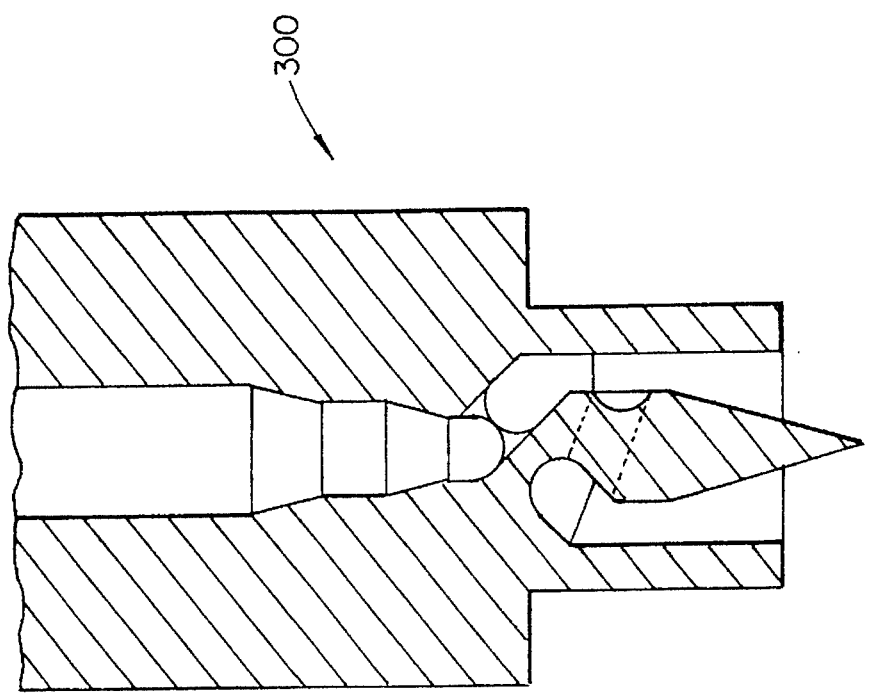
FIG. 16 is an enlarged, illustrative, sectional, side elevational view, partially cut away, of another cone tip bushing in accordance with the present invention.
Figure 17:
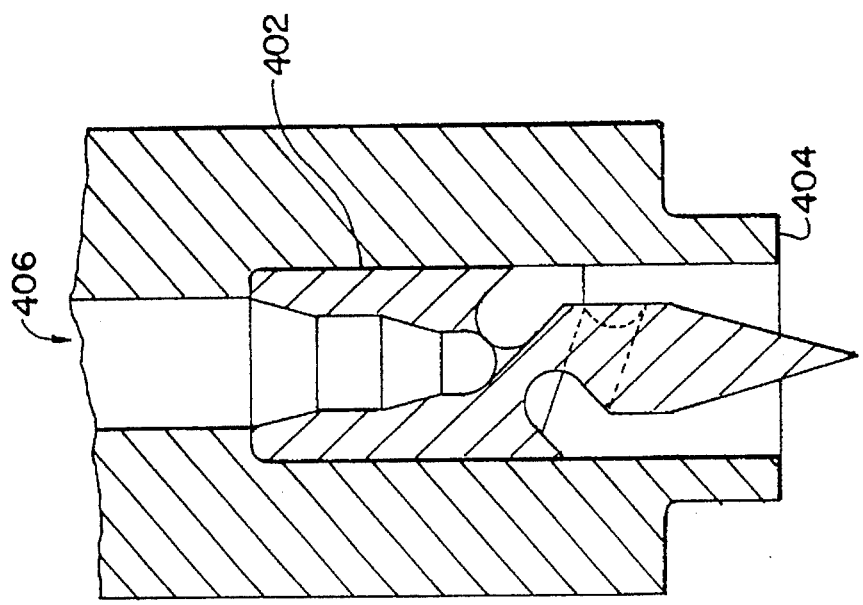
FIG. 17 is an enlarged, illustrative, sectional, side elevational view, partially cut away, of still another cone tip bushing assembly in accordance with the present invention.

Numerous modifications, alterations, changes, variations and substitutions will occur to those skilled in the art in view of the foregoing detailed description of an illustrative preferred embodiment of the invention. For example, as briefly alluded to above, the novel cone tipped bushing of the present invention may be formed as an integral part of the bushing, rather than constructing the bushing out of several interlocking components. An example of such a device 300 is illustratively shown in FIG. 16. Similarly, the extension member described above may be deleted. In such a case, an insert member 400 similar to insert member 206 described above may be located in a counterbore 402 in the distal end 404 of the main bushing lumen 406 as shown in FIG. 17. In each of these alternatives, the bushing itself provides the outer side wall of the heated annular cavity into which the melt flow is directed by the insert structure.

Accordingly, it is to be understood that the foregoing detailed descriptions of several preferred embodiments of the invention have been presented herein by way of illustration only, and not as limitations on the invention disclosed. It is intended that the present invention be limited only by the terms of the claims appended hereto.

We therefore claim:

1. A bushing for use in conveying melt material from a manifold to a gate area in an injection molding apparatus, said bushing comprising:

a longitudinal axis;

an elongate, hollow shaft, said shaft being centered on said longitudinal axis, and including an open proximal end, an open distal end and an internal, longitudinal lumen connecting said open proximal end to said open distal end, said lumen having a first cross-section transverse to said longitudinal axis;

means for heating said bushing; and a tip centered on said longitudinal axis and extending axially and distally from said open distal end of said shaft, said tip comprising:
- (a) an internal, blind, axial bore extending axially and distally from said lumen to a closed distal bore end, said closed distal bore end having a second cross-section transverse to said longitudinal axis smaller than said first cross-section transverse to said longitudinal axis;
- (b) an outer wall having an inner surface and defining an axial volume located in closely distally spaced relation to said closed distal bore end;
- (c) inner walls defining a proximal contoured surface and a distal conically shaped surface terminating at a distal pointed end, said proximal contoured surface being located within said axial volume and being adapted to create a substantially uniform, homogeneous and totally distally directed annular flow of a melt material and to deliver said flow of said melt material to said distal conically shaped surface; and,
- (d) at least one portal connecting said closed distal bore end to said proximal contoured surface defined by said inner walls;

wherein said outer wall and said inner walls together define a distally facing annular cavity having a contoured proximal cavity end and an open distal cavity end, and wherein said pointed distal end of said distal conically shaped surface is located in distally spaced relation to said open cavity end.

2. A bushing according to claim 1 wherein proximally of said distal conically shaped surface, a melt distibution portion connects said shaft to said conically shaped distal surface; said melt distribution portion including a proximal section, a distal section, and a middle section connecting said proximal and distal sections;

said proximal section defining said internal blind axial bore;

said distal section defining a cross-section transverse to said longitudinal axis which is smaller than the cross-section transverse to said longitudinal axis of said lumen and includes a distal periphery which mates with said distal conically shaped surface; and said middle section defining said distally facing annular cavity such that said inner walls form at least one distally facing shoulder having an inner edge and an outer edge, said outer edge extending substantially helically and distally along said inner surface of said outer wall, said inner edge extending substantially helically and distally along an axial projection of said distal periphery of said distal section, and said at least one shoulder having a face which slants inwardly and distally from said outer edge to said inner edge.

3. A bushing according to claim 2 wherein each of said at least one shoulder face includes means for facilitating the flow of a melt material therealong.

4. A bushing according to claim 3 wherein:

each said shoulder face defines a path extending distally and helically relative to said longitudinal axis from said at least one portal;

said tip further comprises melt flow facilitation means, said melt flow facilitation means including at least one groove having a distal end and a proximal end, and extending substantially perpendicularly into each said shoulder face and distally along each said path; and, said at least one portal extends at a distal and outward slant from said closed bore end to said proximal end of said at least one groove;

whereby molten plastic material may flow through said longitudinal lumen, into said blind bore, through said at least one portal into said distally facing annular cavity and ultimately in the form of a substantially uniform, homogeneous and totally distally directed annular mass along said outer surface of said distal conically shaped surface.

5. The bushing according to claim 4 wherein a single groove extends from said groove proximal end 360° around said middle section.

6. The bushing according to claim 4 wherein a pair of grooves extend 180° from a common groove proximal end in opposite directions around said middle section to a common groove distal end.

7. The bushing according to claim 1 wherein said annular cavity is formed by the joinder of said inner walls and said inner surface of said outer wall.

8. The bushing according to claim 1 further comprising a thin-walled seal and means for mounting said seal to said bushing substantially adjacent to the outer periphery of said open distal cavity end.

9. The bushing according to claim 1 wherein said tip is formed of beryllium/copper alloy.

10. The bushing according to claim 2 wherein said said tip comprises:

an extension member including a proximal end, a distal end, and said outer wall so as to define a longitudinal passageway connecting said proximal and distal ends; and, an insert member including said proximal section, said middle section, said distal section and said conically shaped distal surface;

said extension member being attached to said distal end of said shaft and extending axially and distally therefrom, said insert member being attached to said proximal end of said extension member so as to extend axially therethrough such that said proximal section axially and circumferentially engages the periphery of said passageway, and at least a portion of said distal conically shaped surface protrudes beyond said distal end of said extension member.

11. The bushing according to claim 1 wherein said shaft and said tip are formed integrally with one another.

12. The bushing according to claim 1 wherein said shaft includes side walls, a counterbore extends into said distal end of said shaft, said counterbore having a cross-section transverse to said longitudinal axis larger than the cross-section tranverse to said longitudinal axis of said lumen, and an insert member defining said inner walls is disposed within said counterbore such that at least a distal part of said distal conically shaped surface extends axially and distally outwardly from said distal end of said shaft.

13. The bushing according to claim 4 wherein the pitch angle of said at least one groove relative to said longitudinal axis, the depth of each of said at least one groove along its length, the width of each said shoulder face, the total number of grooves, and the total number of portals connecting the internal axial blind bore to the proximalmost portion of said distally facing shoulders are selected relative to one another such that the flow of melt through said bushing results in a uniform, homogeneous and totally distally directed annular mass of melt material exiting the distal open end of said annular cavity.

14. The bushing according to claim 4 wherein the characteristics of said melt flow are determined by variations in the depth of each of said at least one groove along its path.

15. An injection molding apparatus comprising:
a source of melt material;
a heated manifold having an upper surface and a lower surface and defining at least one runner channel extending therethrough from said upper surface to said lower surface;
a cooled mold having a top surface, an outer cavity extending into said top surface which is centered on a first longitudinal axis and having side walls and a base, an internal article formation cavity and a gate extending substantially axially through said base so as to connect said outer cavity to said article formation cavity; and
a heated bushing, said bushing comprising:
a second longitudinal axis;
an elongate, hollow shaft, said shaft being centered on said longitudinal axis, and including an open proximal end, an open distal end and an internal, longitudinal lumen connecting said open proximal end to said open distal end;
means for heating said bushing; and
a tip centered on said second longitudinal axis and extending axially and distally from said open distal end of said shaft, said tip comprising:
(a) an internal, blind, axial bore extending axially and distally from said lumen to a closed distal bore end;
(b) an outer wall having an inner surface and defining an axial volume located in closely distally spaced relation to said closed distal bore end;
(c) inner walls defining a proximal contoured surface and a distal conically shaped surface terminating at a distal pointed end, said proximal contoured surface being located within said axial volume and being adapted to create a substantially uniform, homogeneous and totally distally directed annular flow of a melt material and to deliver said flow of said melt material to said distal conically shaped surface; and,
(d) at least one portal connecting said closed distal bore end to said proximal contoured surface defined by said inner walls;
wherein said outer wall and said inner walls together define a distally facing annular cavity having a contoured proximal cavity end and an open distal cavity end, and wherein said pointed distal end of said distal conically shaped surface is located in distally spaced relation to said open cavity end,
said apparatus being so assembled that (a) said source communicates with said runner channel adjacent said upper surface of said manifold, (b) said first longitudinal axis is aligned with said second longitudinal axis, and (c) said bushing extends from said lower surface of said manifold into said outer cavity of said mold in closely spaced relation to said side walls and said base of said outer cavity, such that said lumen communicates with said runner channel, and such that said pointed distal end of said tip is located in closely spaced relation into said gate.

16. An apparatus according to claim 15 wherein proximally of said distal conically shaped surface, a melt distribution portion connects said shaft to said conically shaped distal surface; said melt distribution portion including a proximal section, a distal section, and a middle section connecting said proximal and distal sections;
said proximal section defining said internal, blind axial bore;
said distal section defining a cross-section transverse to said second longitudinal axis which is smaller than the cross-section transverse to said longitudinal axis of said lumen and includes a distal periphery which mates with said distal conically shaped surface; and
said middle section defining said distally facing annular cavity such that said inner walls for at least one distally facing shoulder having an inner edge and an outer edge, said outer edge extending substantially helically and distally along said inner surface of said outer wall, said inner edge extending substantially helically and distally along an axial projection of said distal periphery of said distal section, and said at least one shoulder having a face which slants inwardly and distally from said outer edge to said inner edge.

17. An apparatus according to claim 16 wherein:
each of said at least one shoulder face includes means for facilitating the flow of a melt material therealong.

18. An apparatus according to claim 17 wherein:
each said shoulder face defines a path extending distally from said at least one portal and helically relative to said longitudinal axis;
said tip further comprises melt flow facilitation means, said melt flow facilitation means including at least one groove having a distal end and a proximal end, and extending substantially perpendicularly into each said shoulder face and distally along each said path; and,
said at least one portal extends at a distal and outward slant from said closed bore end to said proximal end of said at least one groove;
whereby molten plastic material may flow through said longitudinal lumen, into said blind bore, through said at least one portal into said distally facing annular cavity and ultimately in the form of a substantially uniform, homogeneous and totally distally directed annular mass along said outer surface of said distal conically shaped surface.

19. An apparatus according to claim 18 wherein a single groove extends from said groove proximal end 360° around said middle section.

20. An apparatus according to claim 18 wherein a pair of grooves extend 180° from a common groove proximal end in opposite directions around said middle section to a common groove distal end.

21. An apparatus according to claim 15 wherein said annular cavity is formed by the joinder of said inner walls and said inner surface of said outer wall.

22. An apparatus according to claim 15 further comprising a thin-walled seal and means for mounting said seal to said bushing substantially adjacent to the outer periphery of said open distal cavity end.

23. An apparatus according to claim 15 wherein said tip is formed of beryllium/copper alloy.

24. An apparatus according to claim 16 wherein said said tip comprises:
an extension member including a proximal end, a distal end, and said outer wall so as to define a longitudinal passageway connecting said proximal and distal ends; and,
an insert member including said proximal section, said middle section, said distal section and said conically shaped distal surface;

said extension member being attached to said distal end of said shaft and extending axially and distally therefrom, said insert member being attached to said proximal end of said extension member so as to extend axially therethrough such that said proximal section axially and circumferentially engages the periphery of said passageway, and at least a portion of said distal conically shaped surface protrudes beyond said distal end of said extension member.

25. An apparatus according to claim 15 wherein said shaft and said tip are formed integrally with one another.

26. An apparatus according to claim 15 wherein said shaft includes side walls, a counterbore extends into said distal end of said shaft, said counterbore having a cross-section transverse to said longitudinal axis larger than the cross-section transverse to said longitudinal axis of said lumen, and an insert member defining said inner walls is disposed within said counterbore such that at least a distal part of said distal conically shaped surface extends axially and distally outwardly from said distal end of said shaft.

27. The bushing according to claim 18 wherein the pitch angle of said at least one groove relative to said longitudinal axis, the depth of each of said at least one groove along its length, the width of each said shoulder face, the total number of grooves, and the total number of portals connecting the internal axial blind bore to the proximalmost portion of said distally facing shoulders are selected relative to one another such that the flow of melt through said bushing results in a uniform, homogeneous and totally distally directed annular mass of melt material exiting the distal open end of said annular cavity.

28. The bushing according to claim 18 wherein the characteristics of said melt flow are determined by variations in the depth of each of said at least one groove along its path.

29. An apparatus according to claim 21 wherein said shaft includes side walls, a counterbore extends into said distal end of said shaft, said counterbore having a cross-section transverse to said longitudinal axis larger than the cross-section transverse to said longitudinal axis of said lumen, and an insert member is disposed within said counterbore such that at least a distal part of said distal conically shaped surface extends axially and distally outwardly from said distal end of said shaft.

30. An apparatus according to claim 21 wherein:
(a) said base of said outer mold cavity includes a proximally extending, bushing centering wall defining a volume adapted to receive said extension portion of said tip, said wall having a proximal edge; and
(b) said distal end of said bushing shaft includes a recess adapted to receive said proximal edge of said bushing centering wall.

31. An apparatus according to claim 30 wherein said bushing centering wall is formed by a second insert member including a wall portion having proximal and distal edges and a flange portion extending radially outwardly from said wall adjacent said distal edge thereof, said flange portion having a transverse cross-section substantially corresponding to the transverse cross-section of said base of said outer cavity in said mold.

32. A bushing assembly for use in injection molding apparatus, said bushing assembly being adapted for at least partial location in a cooled mold; said mold defining an article formation cavity, an outer cavity having a side wall, a first base and a first gate extending between said first base and said article formation cavity; said bushing assembly comprising:
a first member comprising:

a first longitudinal axis, a first end, a second end, a first outer surface, a wall forming a cavity having a first shape extending into said first end to a second base and a second gate extending axially from said second base to said second end, said member being sized for insertion into said outer cavity of said cooled mold in substantially uniformly contacting relation therewith such that said second gate is substantially aligned with said first gate; and a bushing member comprising:
a second longitudinal axis;
an elongate, hollow shaft centered on said second longitudinal axis, said shaft having an open proximal end, an open distal end and an internal, longitudinal lumen connecting said open proximal end to said open distal end;
means for heating said bushing; and
a tip centered on said second longitudinal axis and extending axially and distally from said open distal end of said shaft, said tip comprising:
(a) an internal, blind, axial bore extending axially and distally from said lumen to a closed distal bore end;
(b) an outer wall having an inner surface defining an axial volume located in closely spaced relation to said closed distal bore end;
(c) inner walls defining a proximal contoured surface and a distal conically shaped surface terminating at a distal pointed end, said proximal contoured surface being located within said axial volume and being adapted to create a substantially uniform, homogeneous and totally distally directed annular flow of a melt material and to deliver said flow of said melt material to said distal conically shaped surface; and,
(d) at least one portal connecting said closed distal bore end to said proximal contoured surface defined by said inner walls;
wherein (i) said outer wall and said inner walls together define distally facing annular cavity having a contoured proximal cavity end and an open distal cavity end, (ii) said first and second longitudinal axes are aligned with one another, (iii) said bushing is located at least partially within said cavity in said first member in closely spaced relation to said cavity defining wall and with said open distal cavity end in closely spaced relation to said second base, and (iv) said pointed distal end of said distal conically shaped surface extends axially through said second gate and into said first gate.

33. A bushing assembly for use in an injection molding apparatus, said bushing being adapted for at least partial location in a cooled mold defining an article formation cavity, and an outer cavity having a side wall, said outer cavity opening directly into said article formation cavity; said bushing assembly comprising:
a first member comprising:
a first longitudinal axis, a first end, a second end, a first outer surface, a wall forming a cavity extending into said first end to a base and a gate extending axially from said base to said second end, said member being sized for insertion into said outer cavity in substantially uniformly contacting relation therewith such that said gate connects said cavity of said first member to said article formation cavity of said cooled mold; and a bushing member comprising:
  a second longitudinal axis;
  an elongate, hollow shaft centered on said second longitudinal axis, said shaft having an open proximal end, an open distal end and an internal, longitudinal lumen connecting said open proximal end to said open distal end;
  means for heating said busing; and
  a tip centered on said second longitudinal axis and extending axially and distally from said open distal end of said shaft, said tip comprising:
    (a) an internal, blind, axial bore extending axially and distally from said lumen to a closed distal bore end;
    (b) an outer wall having an inner surface defining an axial volume located in closely distally spaced relation to said closed distal bore end;
    (c) inner walls defining a proximal contoured surface and a distal conically shaped surface terminating at a distal pointed end, said proximal contoured surface being located within said axial volume and being adapted to create a substantially uniform, homogeneous and totally distally directed annular flow of a melt material and to deliver said flow of said melt material to said contoured distal conically shaped surface; and,
    (d) at least one portal connecting said closed distal bore end to said proximal contoured surface defined by said inner walls;
    wherein (i) said outer wall and said inner walls together define distally facing annular cavity having a contoured proximal cavity end and an open distal cavity end, (ii) said first and second longitudinal axes are aligned with one another, (iii) said bushing is located at least partially within said cavity in said first member in closely spaced relation to said cavity defining wall and with said open distal cavity end in closely spaced relation to said base, and (iv) said pointed distal end of said distal conically shaped surface extends axially into said gate.

34. An injection molding apparatus, said apparatus comprising:
  a source of melt material having a first outlet orifice;
  a manifold including a first top surface, a bottom surface, an inlet orifice in said first top surface communicating with said first outlet orifice, at least one second outlet orifice in said bottom surface, at least one internal runner channel connecting said inlet orifice to at least one of said second outlet orifices, and means for heating said manifold externally of said runner channels so as to maintain said manifold at a predetermined temperature;
  a mold located in spaced relation to said manifold by spacer elements having low thermal conductivity, said mold including a second top surface, an outer cavity extending into said second top surface having side walls and a base, an internal article formation cavity, a gate connecting said base to said article formation cavity, and means for cooling said mold externally of said outer cavity, said article formation cavity and said gate;
  a bushing including a longitudinal axis, an elongate shaft and a distal tip;
  said shaft having an open top end, an open bottom end, a first lumen connecting said open top end to said open bottom end, a first counterbore extending into said bottom end of said shaft, and a second counterbore extending into said bottom end of said shaft, said second counterbore having a shorter axial length and a larger diameter than said first counterbore, said open top end of said shaft being attached to said bottom surface of said manifold in communication with said second outlet orifice, and said shaft extending through said space between said manifold and said mold and into said outer cavity of said molding spaced relation to said side wall thereof;
  shaft centering means including an annular wall extending proximally from said base to a proximal edge, said annular wall surrounding an axial projection of said gate, and said proximal edge of said annular wall engaging said second counterbore in said bottom end of said shaft; and
  said distal tip of said bushing including an outer extension portion and an inner melt distribution portion;
  said outer extension portion having a proximal end, a distal end located in closely spaced relation to said base of said outer mold cavity, an outer surface located within and in closely spaced relation to said annular wall of said shaft centering means, a radial flange extending outwardly from said outer surface adjacent said proximal end and engaging said first counterbore, a second internal lumen connecting said proximal end to said distal end and having a proximal portion and a distal portion, said second lumen further including an inwardly tapered portion adjacent to said distal end, and a third counterbore extending into said proximal end of said extension portion; and
  said inner melt distribution portion including a proximal section, a distal section and a middle section connecting said proximal and distal sections;
  said proximal section having a proximal end, an outer surface axially and circumferentially engaging the periphery of said proximal portion of said second lumen, a second radial flange extending outwardly from said outer surface adjacent to said proximal end in engagement with said third counterbore, and a blind axial bore extending into said proximal end such that said blind axial bore communicates with said first lumen of said shaft;
  said distal section including a distally pointed, conically shaped outer surface which extends distally of said extension portion so as to locate said pointed end substantially centrally within said gate; and
  said middle portion including at least one portal extending outwardly and distally from said closed end of said blind axial bore and an outer surface defining at least one shoulder having an inner edge and an outer edge, said outer edge extending substantially helically and distally along a distal axial projection of the periphery of the cross-section of said proximal section transverse to said longitudinal axis, said inner edge extending substantially helically and distally along an axial projection of the periphery of the largest cross-section of said distal section transverse to said longitudinal axis, and said at least one shoulder defining a face which slants inwardly and distally from said outer edge to said inner edge.

35. A bushing for use in conveying melt material from a manifold to a gate area in an injection molding apparatus, said bushing comprising:
  a longitudinal axis; an elongate, hollow shaft, said shaft being centered on said longitudinal axis, and including an open proximal end, an open distal end and an internal, longitudinal lumen connecting said open proximal end to said open distal end, said lumen having a first cross-section transverse to said longitudinal axis;

means for heating said bushing; and a tip centered on said longitudinal axis and extending axially and distally from said open distal end of said shaft, said tip comprising:

an extension member including a proximal end, a distal end, and an outer wall having an inner surface defining a longitudinal passageway connecting said proximal and distal ends, said extension member being attached to said distal end of said shaft and extending axially and distally therefrom;

an insert member including a distal conically shaped portion having an outer surface terminating at a distal pointed end, and a melt distibution portion connecting said shaft to said distal conically shaped portion; said melt distribution portion including a proximal section, a distal section, and a middle section connecting said proximal and distal sections, and being attached to said proximal end of said extension member so as to extend axially therethrough such that said proximal section axially and circumferentially engages the periphery of said passageway, and at least a portion of said distal conically shaped surface protrudes beyond said distal end of said extension member;

said proximal section defining an internal, blind, axial bore extending axially and distally from said lumen to a closed distal bore end, said closed distal bore end having a second cross-section transverse to said longitudinal axis smaller than said first cross-section transverse to said longitudinal axis;

said distal section defining a cross-section transverse to said longitudinal axis which is smaller than the cross-section transverse to said longitudinal axis of said passageway and includes a distal periphery which mates with said distal conically shaped portion; and said middle section defining within said passageway proximately contoured inner walls forming with said extension member in closely spaced distal relation to said closed distal bore end a distally facing annular cavity such that said inner walls form at least one distally facing shoulder having an inner edge and an outer edge, said outer edge extending substantially helically and distally along said inner surface of said outer wall, said inner edge extending substantially helically and distally along an axial projection of said distal periphery of said distal section, and said at least one shoulder having a face which slants inwardly and distally from said outer edge to said inner edge at least one portal connecting said closed distal bore end to said proximal contoured surface defined by said inner walls;

said bushing being adapted to create a substantially uniform, homogeneous and totally distally directed annular flow of a melt material and to deliver said flow of said melt material to said outer surface of said distal conically shaped surface, and wherein said outer wall and said inner walls together define a distally facing annular cavity having a contoured proximal end and an open distal cavity end such that said pointed distal end of said distal conically shaped surface is located in distally spaced relation to said open distal cavity end.

36. An injection molding apparatus comprising:

a source of melt material;

a heated manifold having an upper surface and a lower surface and defining at least one runner channel extending therethrough from said upper surface to said lower surface;

a cooled mold having a top surface, an outer cavity extending into said top surface which is centered on a first longitudinal axis and having side walls and a base, an internal article formation cavity and a gate extending substantially axially through said base so as to connect said outer cavity to said article formation cavity; and a heated bushing, said bushing comprising:

a second longitudinal axis;

an elongate, hollow shaft, said shaft being centered on said longitudinal axis, and including an open proximal end, an open distal end and an internal, longitudinal lumen connecting said open proximal end to said open distal end, said lumen having a first cross-section transverse to said longitudinal axis;

means for heating said bushing; and a tip centered on said longitudinal axis and extending axially and distally from said open distal end of said shaft, said tip comprising:

an extension member including a proximal end, a distal end, and an outer wail having an inner surface defining a longitudinal passageway connecting said proximal and distal ends, said extension member being attached to said distal end of said shaft and extending axially and distally therefrom;

an insert member including a distal conically shaped portion having an outer surface terminating at a distal pointed end, and a melt distibution portion connecting said shaft to said distal conically shaped portion; said melt distribution portion including a proximal section, a distal section, and a middle section connecting said proximal and distal sections, and being attached to said proximal end of said extension member so as to extend axially therethrough such that said proximal section axially and circumferentially engages the periphery of said passageway, and at least a portion of said distal conically shaped surface protrudes beyond said distal end of said extension member;

said proximal section defining an internal, blind, axial bore extending axially and distally from said lumen to a closed distal bore end, said closed distal bore end having a second cross-section transverse to said longitudinal axis smaller than said first cross-section transverse to said longitudinal axis;

said distal section defining a cross-section transverse to said longitudinal axis which is smaller than the cross-section transverse to said longitudinal axis of said passageway and includes a distal periphery which mates with said distal conically shaped portion; and said middle section defining within said passageway proximately contoured inner walls forming with said extension member in closely spaced distal relation to said closed distal bore end a distally facing annular cavity such that said inner walls form at least one distally facing shoulder having an inner edge and an outer edge, said outer edge extending substantially helically and distally along said inner surface of said outer wall, said inner edge extending substantially helically and distally along an axial projection of said distal periphery of said distal section, and said at least one shoulder having a face which slants inwardly and distally from said outer edge to said inner edge at least one portal connecting sad closed distal bore end to said proximal contoured surface defined by said inner walls;

said bushing being adapted to create a substantially uniform, homogeneous and totally distally directed annular flow of a melt material and to deliver said flow of said melt passage to said outer surface of said distal conically shaped surface, and wherein said outer wall and said inner walls together define a distally facing annular cavity having a contoured proximal cavity end and an open distal cavity end such that said pointed distal end of said distal conically shaped surface is located in distally spaced relation to said open cavity end.

* * * * *